US009746860B2

(12) United States Patent
Sakaue et al.

(10) Patent No.: US 9,746,860 B2
(45) Date of Patent: Aug. 29, 2017

(54) ELECTRIC TOOL ADAPTOR AND ELECTRIC TOOL SYSTEM USING SAME

(75) Inventors: Masaaki Sakaue, Mie (JP); Masaki Ikeda, Shiga (JP); Akira Kawai, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 24 days.

(21) Appl. No.: 13/813,972

(22) PCT Filed: Jul. 21, 2011

(86) PCT No.: PCT/JP2011/066594
§ 371 (c)(1),
(2), (4) Date: Jan. 29, 2015

(87) PCT Pub. No.: WO2012/017833
PCT Pub. Date: Feb. 9, 2012

(65) Prior Publication Data

US 2013/0154584 A1 Jun. 20, 2013

(30) Foreign Application Priority Data

Aug. 4, 2010 (JP) ................................ 2010-175634

(51) Int. Cl.
*H02J 7/00* (2006.01)
*G05F 1/46* (2006.01)
*B25F 5/00* (2006.01)

(52) U.S. Cl.
CPC . *G05F 1/46* (2013.01); *B25F 5/00* (2013.01)

(58) Field of Classification Search
USPC ............ 318/17; 320/112–115; 327/564–566; 361/142
See application file for complete search history.

(56) References Cited

U.S. PATENT DOCUMENTS 6,104,162 A * 8/2000 Sainsbury ............ H02J 7/0057 320/107
6,172,860 B1 1/2001 Yoshimizu et al.
6,501,197 B1 * 12/2002 Cornog .................... B25F 5/00 307/150

(Continued)

FOREIGN PATENT DOCUMENTS

DE 102008040061 A1 1/2010
JP 03-62783 U 6/1991

(Continued)

OTHER PUBLICATIONS

International Search Report for corresponding International Application No. PCT/JP2011/066594 mailed Oct. 11, 2011.

(Continued)

*Primary Examiner* — Adolf Berhane
*Assistant Examiner* — Gary Nash
(74) *Attorney, Agent, or Firm* — Renner, Otto, Boisselle & Sklar, LLP

(57) ABSTRACT

An electric tool adaptor is configured to be disposed between an electric tool and a battery pack and attached detachably with respect to the electric tool and the battery pack. This adaptor includes a DC-DC converter configured to increase or reduce a voltage of the battery pack to convert the voltage to a drive voltage of the electric tool and supply the drive voltage to the electric tool.

7 Claims, 5 Drawing Sheets

(56) References Cited

U.S. PATENT DOCUMENTS

| | | | |
|---|---|---|---|
| 6,502,949 B1 | 1/2003 | Horiyama et al. | |
| 8,237,404 B2 | 8/2012 | Takano et al. | |
| 8,354,183 B2 | 1/2013 | Konuma et al. | |
| 2002/0175654 A1* | 11/2002 | Takano | H02J 7/0047 320/115 |
| 2004/0088817 A1 | 5/2004 | Cochran et al. | |
| 2006/0244414 A1 | 11/2006 | Lay | |
| 2007/0279000 A1* | 12/2007 | Lucero | B25F 5/00 320/112 |
| 2008/0012526 A1* | 1/2008 | Sadow | H02J 7/0044 320/111 |
| 2008/0122400 A1* | 5/2008 | Kubota et al. | 320/106 |
| 2009/0108806 A1* | 4/2009 | Takano et al. | 320/112 |
| 2010/0062326 A1 | 3/2010 | Konuma et al. | |
| 2010/0084150 A1* | 4/2010 | Suzuki et al. | 173/2 |
| 2010/0085010 A1* | 4/2010 | Suzuki et al. | 320/132 |
| 2010/0096155 A1* | 4/2010 | Iwata et al. | 173/176 |
| 2011/0147031 A1 | 6/2011 | Matthias et al. | |
| 2011/0197389 A1 | 8/2011 | Ota et al. | |
| 2011/0198103 A1 | 8/2011 | Suzuki | |
| 2012/0262035 A1 | 10/2012 | Takano et al. | |

FOREIGN PATENT DOCUMENTS

| | | | |
|---|---|---|---|
| JP | 04-150727 | A | 5/1992 |
| JP | 10-003895 | A | 1/1998 |
| JP | 11-262172 | A | 9/1999 |
| JP | 2001-300867 | A | 10/2001 |
| JP | 2002-027675 | A | 1/2002 |
| JP | 2003-235770 | A | 8/2003 |
| JP | 2004-160235 | A | 6/2004 |
| JP | 2004-255569 | A | 9/2004 |
| JP | 2005-278375 | A | 10/2005 |
| JP | 2006-334773 | A | 12/2006 |
| JP | 2008-073799 | A | 4/2008 |
| JP | 2008-177138 | A | 7/2008 |
| JP | 2008-178278 | A | 7/2008 |
| JP | 2011-161602 | A | 8/2011 |
| JP | 2011-161603 | A | 8/2011 |

OTHER PUBLICATIONS

PCT/ISA/237 for corresponding International Application No. PCT/JP2011/066594 dated Oct. 11, 2011.

* cited by examiner

ELECTRIC TOOL ADAPTOR AND ELECTRIC TOOL SYSTEM USING SAME

TECHNICAL FIELD

The present invention relates to an electric tool adaptor configured to be disposed between an electric tool and a battery pack and attached detachably with respect to the electric tool and the battery pack, and an electric tool system using the same.

BACKGROUND ART

Conventionally, there is known a configuration which allows attachment of a battery pack which can be directly attached to an electric tool and attachment of a battery pack different from the above battery pack by, e.g., Japanese Patent Application Publication No. 2008-73799 (hereinafter referred to as "Document 1"). In the electric tool of Document 1, placement of an electric tool adaptor between the electric tool and the battery pack allows a plurality of types of battery packs to be attached to the electric tool.

The electric tool adaptor of Document 1 allows the battery pack, which cannot be directly attached to the attachment portion of the electric tool due to a difference in shape, to be attached to the electric tool via the adaptor simply by configuring the shape of the adaptor such that the shape thereof fits the battery pack and the electric tool.

By connecting the electric tool and the battery pack with the electric tool adaptor having the above configuration disposed between the electric tool and the battery pack, it becomes possible to attach a plurality of types of battery packs to a specific electric tool.

By the way, if the above electric tool adaptor is used, even when the voltage of the battery pack is different from the rated voltage of the electric tool, a user can use the electric tool. However, the rated voltage indicates a voltage at which the electric tool can be safely used, and hence, when the battery pack having a voltage higher than the rated voltage is used, there have been chases where heat generated by a motor in the electric tool is increased and the electric tool breaks down. On the other hand, when the battery pack having a voltage lower than the rated voltage is used, there have been cases where performance required by the user cannot be exhibited.

SUMMARY OF INVENTION

The present invention has been achieved in view of the above circumstances, and an object thereof is to provide an electric tool adaptor capable of excellently driving an electric tool even when a battery pack having a voltage different from the rated voltage of the electric tool is used, and an electric tool system using the same.

An adaptor of the present invention is configured to be disposed between an electric tool and a battery pack and attached detachably with respect to the electric tool and the battery pack. The adaptor comprises a DC-DC converter configured to increase or reduce a voltage of the battery pack to convert the voltage thereof to a drive voltage of the electric tool and supply the drive voltage to the electric tool.

In an embodiment, the drive voltage is a rated voltage of the electric tool, and the DC-DC converter is a step-up/down converter.

In an embodiment, the step-up/down converter is configured to convert the voltage of the battery pack to a plurality of levels of the rated voltage.

In an embodiment, the electric tool and the battery pack are a first electric tool configured to use a first battery pack and a second battery pack for a second electric tool, respectively. The first battery pack for the first electric tool is configured to generate a first electromotive force for driving the first electric tool while the second battery pack for the second electric tool is configured to generate a second electromotive force for driving the second electric tool. The first electromotive force and the second electromotive force correspond to a first drive voltage of the first electric tool and a second drive voltage of the second electric tool, respectively and are different from each other.

In an embodiment, the electric tool adaptor further includes a tool connection portion configured to be detachably attached to the first electric tool, and a battery connection portion configured to be detachably attached to the second battery pack.

In an embodiment, the first and second electric tools comprise first and second attachment portions for providing attachment of the first and second battery packs to the first and second electric tools, respectively. The first and second battery packs comprise first and second attached portions configured to be attached to the first and second attachment portions, respectively. The tool connection portion has a shape corresponding to the first attached portion while the battery connection portion has a shape corresponding to the second attachment portion.

In an electric tool system of the present invention, the adaptor described above is used, and any one of a plurality of types of battery packs which are different from each other can be attached to an electric tool having a predetermined rated voltage.

In an electric tool system of the present invention, the adaptor described above is used, and any one of a plurality of types of battery packs which are different from each other can be attached to any one of a plurality of types of electric tools having different rated voltages.

According to the electric tool adaptor of the present invention and the electric tool system using the same, it is possible to excellently drive the electric tool even when the battery pack having a voltage different from the rated voltage of the electric tool is used.

BRIEF DESCRIPTION OF DRAWINGS

Preferred embodiments of the invention will now be described in further details. Other features and advantages of the present invention will become better understood with regard to the following detailed description and accompanying drawings where.

DESCRIPTION OF EMBODIMENTS

Figure 1:
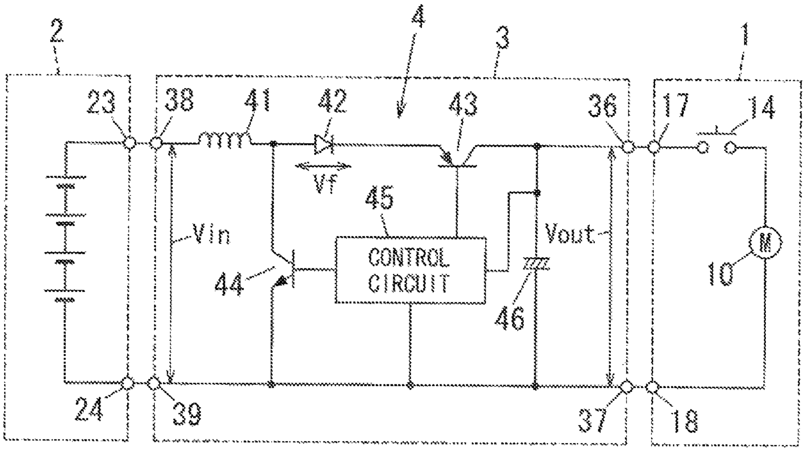
FIG. 1 is a circuit diagram of an electric tool system in accordance with an embodiment of the present invention.
Figure 2:
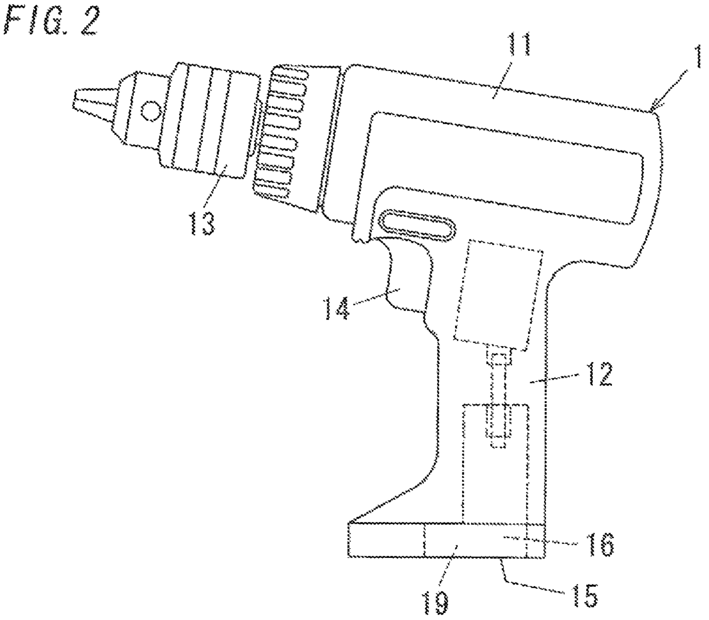
FIG. 2 is a side view of an electric tool thereof.

As shown in FIGS. 1 and 2, an electric tool system of the present embodiment is a system in which any one of a plurality of battery packs having different voltages can be attached to a predetermined electric tool 1 directly or via an electric tool adaptor. In the electric tool system, an electric tool adaptor (hereinafter referred to as an “adaptor”) 3 is configured to be attached to an electric tool 1 and a battery pack 2 between the electric tool 1 and the battery pack 2. In addition, the adaptor 3 is configured to increase or reduce a voltage of the battery pack 2 to convert the voltage thereof into a drive voltage of the electric tool 1 and supply the drive voltage to the electric tool 1.

As shown in FIG. 2, the electric tool 1 has an outer cover that is formed of a tubular housing 11 and a handle 12 extending laterally (downwardly) from the housing 11. In the electric tool 1, a motor 10 serving as a drive source is accommodated in the housing 11. The motor 10 is connected to a reduction gear mechanism portion formed of a plurality of gear trains, and transmits power to a drive portion 13 via the reduction gear mechanism portion. The drive portion 13 is rotatably provided at an end portion on a tip side of the housing 11, and a front end tool such as a driver bit or the like is attached to the tip thereof. The electric tool 1 is provided with a switch 14 that can be depressed and protruded in a recessed corner portion formed by the housing 11 and the handle 12. The switch 14 is configured to control the supply of electric power to the motor 10 according to adjustment of the depression amount. The electric tool 1 is provided with an attachment portion 15 for the attachment of the adaptor 3 or the battery pack 2 at the lower end of the handle 12.

The electric tool 1 and the battery pack 2 are a first electric tool configured to use a first battery pack (not shown) and a second battery pack for a second electric tool (not shown), respectively. The first electric tool 1 includes the first attachment portion 15 for providing attachment of the first battery pack to the first electric tool 1. Similarly, the second electric tool includes a second attachment portion for providing attachment of the second battery pack 2 to the second electric tool. The first battery pack includes a first attached portion (see 33 of FIG. 3) configured to be attached to the first attachment portion 15. Similarly, the second battery pack includes a second attached portion (see 22 of FIG. 4) configured to be attached to the second attachment portion. The first battery pack for the first electric tool 1 is configured to generate a first electromotive force for driving the first electric tool 1. The second battery pack 2 for the second electric tool is configured to generate a second electromotive force for driving the second electric tool. The first electromotive force and the second electromotive force correspond to a first drive voltage of the first electric tool 1 and a second drive voltage of the second electric tool respectively, and they are different from each other. Desirably, the first drive voltage is a rated voltage of the first electric tool 1, and the second drive voltage is a rated voltage of the second electric tool. Note that each drive voltage may also be a voltage within a drive voltage range of a corresponding electric tool.

Consequently, either the first battery pack or the second battery pack can be selectively attached to the attachment portion 15 of the electric tool (the first electric tool) 1 directly or via the adaptor 3. The attachment portion 15 of the electric tool (the first electric tool) 1 in the present embodiment has a concave portion 16 provided in a lower end surface of the handle 12 and a terminal provided on a bottom-side surface of the concave portion 16, and serves as what is called a plug-in attachment portion 15. The attachment portion of the second electric tool is also configured substantially similarly to the attachment portion 15. As shown in FIG. 1, the terminal of the electric tool 1 has a first tool-side terminal 17 connected to a positive electrode of the first battery pack or a positive electrode side of the second battery pack 2, and a second tool-side terminal 18 connected to a negative electrode of the first battery pack or a negative electrode side of the second battery pack 2. The attachment portion 15 has a pair of engaged portions 19 that are configured to be engaged with a pair of engagement portions 31 provided in the adaptor 3, a pair of engagement portions provided in the first battery pack (see 31 of FIG. 3), or a pair of engagement portions 21 provided in the second battery pack 2. With this configuration, when a plug-in convex portion 35 of the adaptor 3, a plug-in portion of the first battery pack, or a plug-in portion 22 of the second battery pack 2 is inserted up to a predetermined position, the engaged portions 19 prevent the detachment thereof. At this point, the terminals 17 and 18 of the attachment portion 15 are brought into contact with and electrically connected to terminals 36 and 37 of the adaptor 3 or the terminals of the first battery pack 2.

Figure 3:
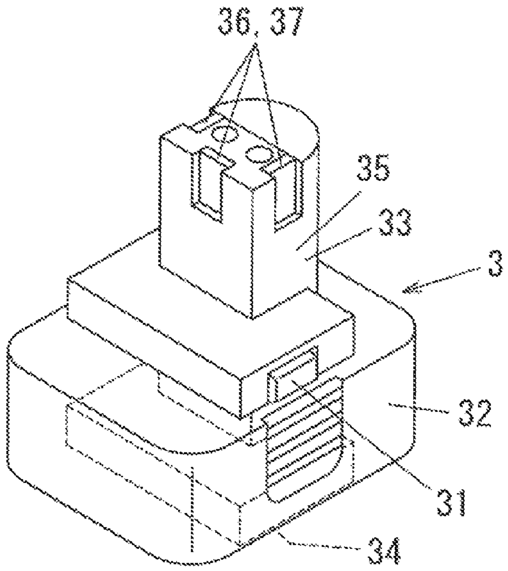
FIG. 3 is a perspective view of an electric tool adaptor used for the electric tool thereof.
Figure 4:
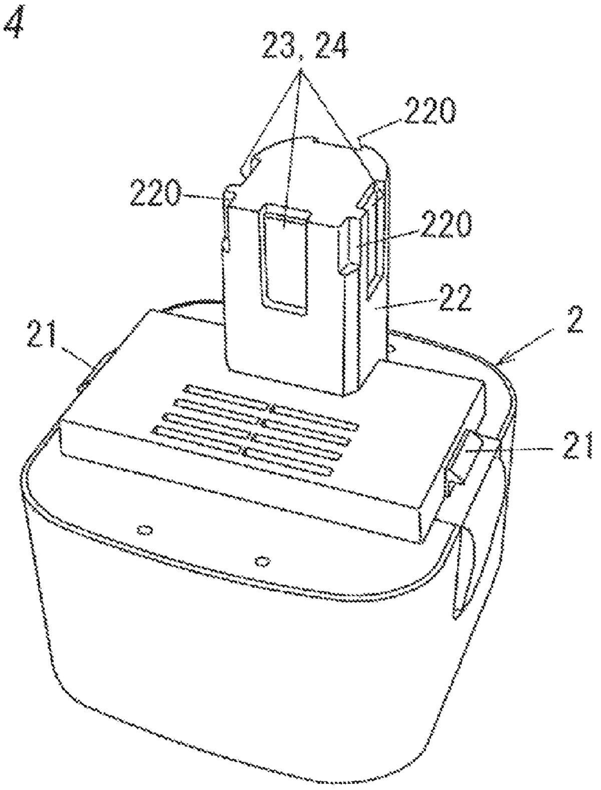
FIG. 4 is a perspective view of a battery pack used for another electric tool different from the electric tool thereof.

For example, as shown in FIG. 4, the second attached portion of the battery pack 2 includes the plug-in portion 22 which protrudes upwardly. Similarly, the first attached portion of the first battery pack includes the plug-in portion (see 35 of FIG. 3). The plug-in portion 22 has terminals 23 and 24 at its tip portion. As shown in FIG. 1, the terminals are a first power source-side terminal 23 on the positive electrode side and a second power source-side terminal 24 on the negative electrode side. Each of the first and second battery packs has a built-in rechargeable battery, and examples of the rechargeable battery include various secondary batteries such as a nickel-cadmium battery, a nickel metal-hydride battery, and a lithium ion battery. In addition, each of the first and second battery packs may also be a primary battery. Note that the electric power storage element provided in each of the first and second battery packs is not limited to the storage battery, and may also be a capacitor capable of large-capacity storage of electric power such as an electric double layer capacitor.

The electric tool system of the present embodiment includes a plurality of types of the (at least first and second) electric tools that include a plurality of types of the (at least first and second) battery packs, and voltages thereof are different from each other. Note that the battery packs in the electric tool system of the present embodiment have the plug-in portions having substantially the same shape and the attachment methods thereof are identical.

The adaptor 3 is disposed between the electric tool 1 and the battery pack 2 and is attached detachably with respect to the electric tool 1 and the battery pack 2, and is configured to convert the voltage of the battery pack 2 to the drive voltage (e.g., a rated voltage) of the electric tool 1. As shown in FIG. 3, the adaptor 3 includes an adaptor main body 32, a tool connection portion 33 configured to be detachably attached to the electric tool 1, and a battery connection portion 34 configured to be detachably attached to the battery pack 2. The tool connection portion 33 is electrically connected to the electric tool 1, and the battery connection portion 34 is electrically connected to the battery pack 2. The tool connection portion 33 has a shape corresponding to the first attached portion of the first battery pack, while the battery connection portion 34 has a shape corresponding to the second attachment portion of the second electric tool. Specifically, the tool connection portion 33 is formed of the plug-in convex portion 35 which protrudes from one end surface (an upper surface) of the adaptor main body 32, and the plug-in convex portion 35 is fitted into the concave portion 16 of the handle 12 in the electric tool 1. The plug-in convex portion 35 has, on its tip, the output-side terminals 36 and 37 which are electrically connected to the terminals of the electric tool 1. The output-side terminals include the first output-side terminal 36 connected to the first tool-side terminal 17 and the second output-side terminal 37 connected to the second tool-side terminal 18. The battery connection portion 34 is provided on the other end surface (a lower surface) of the adaptor main body 32. The battery connection portion 34 is formed of the plug-in concave portion (see FIG. 3) into which the plug-in portion 22 of the battery pack 2 can be inserted. The plug-in concave portion has, on its bottom-side surface, input-side terminals 38 and 39 which are electrically connected to the terminals of the battery pack 2. The input-side terminals include the first input-side terminal 38 connected to the first power source-side terminal 23 and the second input-side terminal 39 connected to the second power source-side terminal 24.

The adaptor 3 includes, in its internal portion, a DC-DC converter configured to increase or reduce the voltage of the battery pack 2 to convert the voltage thereof into the drive voltage (e.g., the rated voltage) of the electric tool 1, and supply (apply) the drive voltage to the electric tool 1. In the present embodiment, the DC-DC converter is a step-up/down converter 4. Note that the DC-DC converter of the present invention may also be a step-up converter or a step-down converter. As shown in FIG. 1, in the step-up/down converter 4, a coil 41, a diode 42, and a PNP transistor 43 are sequentially connected between the first input-side terminal 38 and the first output-side terminal 36. In addition, in the step-up/down converter 4, an NPN transistor 44 is connected between a coil 41 and the second input-side terminal 39. A control circuit 45 is connected to bases of the NPN transistor 44 and a PNP transistor 43, and ON/OFF of these transistors is controlled by the control circuit 45. In the step-up/down converter 4, a smoothing capacitor 46 is connected to the output side of the adaptor 3.

The control circuit 45 controls the individual transistors such that a voltage Vout between the first output-side terminal 36 and the second output-side terminal 37 has a value corresponding to the drive voltage (e.g., the rated voltage) of the electric tool 1. When the voltage between the first input-side terminal 38 and the second input-side terminal 39 is assumed to be Vin and a voltage drop value of the diode 42 is assumed to be Vf, if $Vin-Vf<$rated voltage is satisfied, the control portion controls the individual transistors to perform step-up control. The control portion controls the PNP transistor 43 such that the PNP transistor 43 is turned OFF and controls the NPN transistor 44 such that ON/OFF of the NPN transistor 44 is repeated, thereby storing electromagnetic energy in the coil 41. Subsequently, at the time point when predetermined energy is stored in the coil 41, the control portion controls the NPN transistor 44 such that the NPN transistor 44 is turned OFF, and controls the PNP transistor 43 such that the PNP transistor 43 is turned ON. As a result, the electromagnetic energy stored in the coil 41 is released, the output voltage of the adaptor 3 is thereby increased, and the increased voltage is applied to the electric tool 1 through the smoothing capacitor 46.

If $Vin-Vf\geq$rated voltage is satisfied, the control portion controls the individual transistors to perform step-down control. The control portion controls the NPN transistor 44 such that the NPN transistor 44 is turned OFF, and controls the PNP transistor 43 such that ON/OFF of the PNP transistor 43 is repeated. As a result, voltages during ON/OFF are smoothed by the smoothing capacitor 46 and the output voltage is thereby reduced.

The values of Vin and the rated voltage are detected by tool voltage detection means (not shown) for detecting a tool-side voltage and power source voltage detection means (not shown) for detecting a power source-side voltage. These voltage detection means are connected to the control circuit 45, and the control circuit 45 performs arithmetic calculation on the basis of the detected values to perform the above controls.

Note that the values of Vin and the rated voltage may also be directly inputted to the control circuit 45 by the manual operation of a user.

In the electric tool system including various (at least the first and second) electric tools provided by the adaptor 3 described above, the various electric tools can share the battery packs for the various electric tools. That is, even when a user uses the battery pack 2 having a voltage higher than a rated voltage, the adaptor 3 of the present embodiment is capable of preventing the breakdown of the electric tool 1 caused by overheating. In addition, even when the user uses the battery pack 2 having a voltage lower than the rated voltage, the adaptor 3 of the present embodiment is capable of causing the electric tool 1 to fully exhibit its performance. Even when any one of the battery packs having different voltages is used, it is possible to apply a voltage corresponding to a rated voltage to the electric tool 1.

In addition, in the electric tool system of the present embodiment, any one of a plurality of types of the battery packs which are different from each other can be attached to the electric tool 1 and the adaptor 3 having the step-up/down converter 4 is disposed between the battery pack and the electric tool 1, and hence it is possible to prevent the breakdown of the electric tool 1 caused by erroneous attachment.

In an embodiment, the electric tool system includes, as the second electric tool, a high-voltage electric tool having a drive voltage (e.g., a rated voltage) higher than that of the first electric tool 1, and a low-voltage electric tool having a drive voltage (e.g., a rated voltage) lower than that of the second electric tool. For example, the drive voltage of the first electric tool is 18 V, the drive voltage of the high-voltage electric tool is 21.6 V, and the drive voltage of the low-voltage electric tool is 14.4 V. In this embodiment, when the high-voltage electric tool is attached, the DC-DC converter of the adaptor 3 reduces the voltage (21.6 V) of the battery pack for the high-voltage electric tool to convert the voltage thereof to the drive voltage (18 V) of the first electric tool, and supplies the drive voltage (18 V) to the first electric tool 1. In addition, when the low-voltage electric tool is attached, the DC-DC converter increases the voltage (14.4 V) of the battery pack for the low-voltage electric tool to convert the voltage thereof to the drive voltage (18 V) of the first electric tool, and supplies the drive voltage (18 V) to the first electric tool 1.

In the electric tool system of the present embodiment, although the plug-in battery packs are used as the plurality of types of the battery packs, the attachment method of the battery pack is not limited thereto. For example, even when the battery pack 2 shown in FIG. 5 is used as the battery pack 2, it is possible to construct the electric tool system of the present embodiment.

Figure 5:
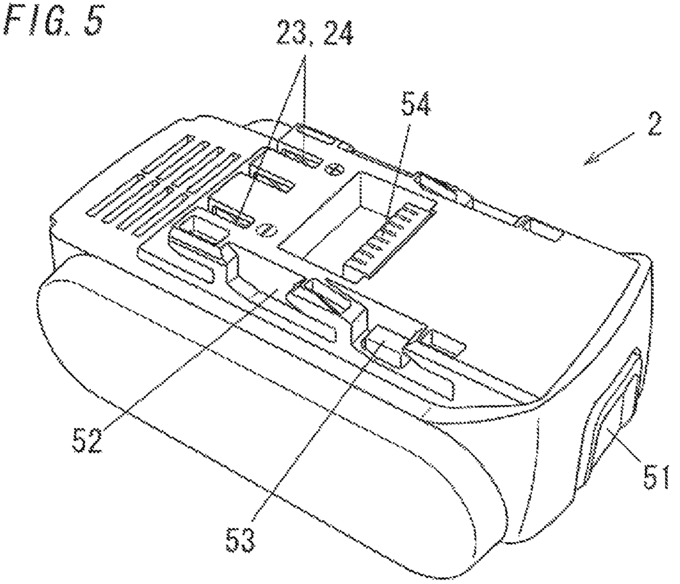
FIG. 5 is a perspective view of a battery pack in an embodiment.

The battery pack 2 shown in FIG. 5 has the power source-side terminals 23 and 24 to which the input-side terminals of the adaptor 3 can be connected on the upper surface of the battery pack 2, and accommodates the battery inside thereof. Slide grooves 52 are provided at four locations in the upper portion of the battery pack 2. Lock portions 53 which can be depressed and protruded are provided in two of the slide grooves 52. Each lock portion 53 is configured to be linked with an operation button 51 provided in one end portion of the battery pack 2, and the lock portion 53 is depressed when the operation button 51 is pressed. Note that the reference numeral 54 indicates a terminal for supplying electric power to a control portion (not shown) of the electric tool 1.

The adaptor (not shown) having the input-side terminals 38 and 39 connected to the input-side terminals 23 and 24 is connected to the battery pack 2 having the above configuration. Although this adaptor 3 is different in shape from the above adaptor 3, this adaptor 3 has the same step-up/down converter 4 as that in the above embodiment. The adaptor 3 has protrusion portions (not shown) inserted into the slide grooves 52. Note that the portion connected to the electric tool 1 is the same as that in the above embodiment. In short, the battery connection portion 34 of the adaptor 3 is configured such that the upper portion of the battery pack 2 shown in FIG. 5 can be attached to the battery connection portion 34 similarly to, e.g., the adaptor of Document 1.

The battery pack 2 having the above configuration is slid laterally relative to the adaptor 3 to be thereby attached to the adaptor 3, and it is possible to construct the electric tool system similar to that of the present embodiment by using this battery pack 2.

Figure 6A:
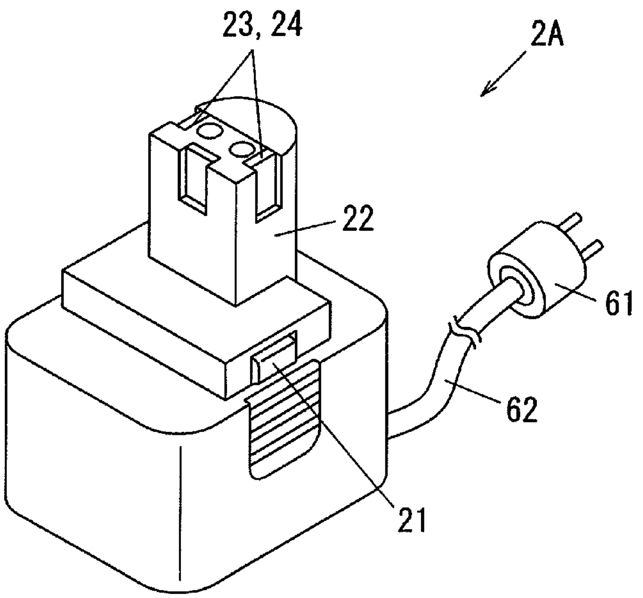
FIG. 6A is a perspective view of a battery pack in an embodiment.
Figure 6B:
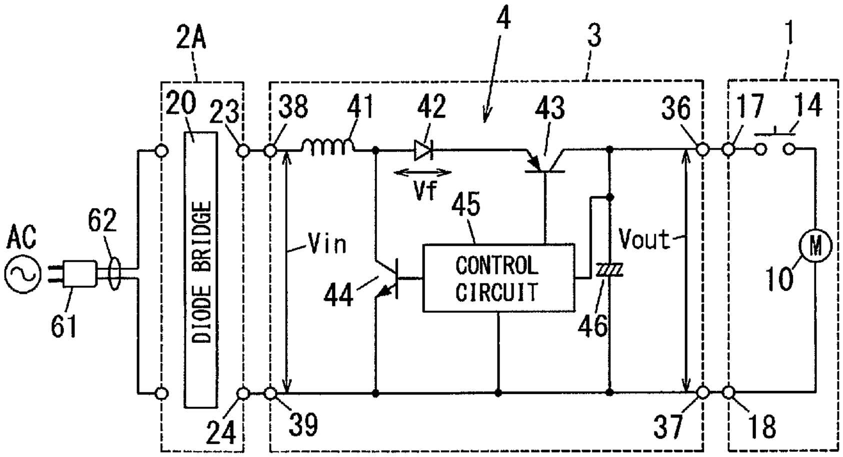
FIG. 6B is a circuit diagram of an electric tool system in accordance with the embodiment of FIG. 6A.

In addition, as another example, it is also possible to use, e.g., a plug pack 2A shown in FIGS. 6A and 6B. The plug pack 2A has a plug 61 connected to a commercial power source. The plug 61 is connected to the main body of the plug pack 2A via a line cord 62.

The adaptor 3 has the step-up/down converter 4 which increases or reduces the voltage of the plug pack 2A of FIGS. 6A and 6B to convert the voltage thereof to the rated voltage of the electric tool 1. The step-up/down converter 4 is the same as the step-up/down converter 4 in the above embodiment except that a diode bridge 20 is provided on the input side of the adaptor 3.

By the step-up/down converter, an AC voltage inputted from the battery pack 2 is rectified and smoothed, and then the voltage is increased or reduced as in the above embodiment. This voltage is applied to the electric tool 1 and the electric tool 1 is thereby driven.

Next, another embodiment will be described. Note that the most part of the present embodiment is the same as the above embodiment so that the description of the same part will be omitted and the different part thereof will be mainly described. Note that, although the depiction of the same part as the above embodiment will be omitted in the present embodiment, the description of the same part as the above embodiment will be given with reference to the drawings of the above embodiment.

An electric tool system of the present embodiment has a plurality of types of (at least first and second) battery packs having different voltages, a plurality of types of (first and second) electric tools having different drive voltages (e.g., rated voltages), and the adaptor 3. In the electric tool system of the present embodiment, any one of the plurality of types of battery packs can be attached to any one of the plurality of types of electric tools 1 directly or via the adaptor 3.

The adaptor 3 of the present embodiment has a setting button which sets a value of Vout. The setting button is capable of setting a plurality levels of the voltage (e.g., 50 V/100 V/150 V . . . ), and is connected to the control circuit 45 of the step-up/down converter 4. When a user performs the setting by using the setting button, the setting button transmits setting information to the control circuit 45. The control circuit 45 having received the setting information controls the transistors 43 and 44 on the basis of the setting information, and causes the value of Vout to approach the set value (see FIG. 1).

The electric tool system of the present embodiment can achieve an extremely wide application range of the electric tool 1 and the battery pack 2, and reduce a restriction on the combination of the electric tool 1 and the battery pack 2.

Although the present invention has been described with reference to the preferred embodiments, various amendments and modifications may be made by those skilled in the art without departing from the essential spirit and scope of the invention, i.e., without departing from the scope of claims.

The invention claimed is:

1. An electric tool system, comprising:
- an electric tool comprising a handle and an attachment portion provided at a lower end of the handle;
- a plug pack comprising a plug-in portion having terminals which corresponds to a plug-in portion having terminals of a battery pack; and
- an electric tool adaptor comprising a tool connection portion configured to be directly detachably attached to the attachment portion of the electric tool and a battery connection portion which allows any plug-in portion of the battery pack and the plug pack to be inserted into, thereby being configured
  - to be disposed between the electric tool and the battery pack and detachably attached directly to the electric tool and the battery pack, and also
  - to be disposed between the electric tool and the plug pack and detachably attached directly to the electric tool and the plug pack, wherein
- only the plug pack and not the battery pack has a plug configured to be connected to a commercial power source,
- a diode bridge is further provided in the plug pack on an input side of the electric tool adaptor, and—
- the electric tool adaptor comprises a DC-DC converter configured
  - to increase or reduce a voltage of the battery pack so as to convert into a drive voltage of the electric tool, and to supply the drive voltage to the electric tool when the electric tool adaptor is detachably attached directly to the electric tool and the battery pack, and also
  - to increase or reduce a voltage obtained through the diode bridge in the plug pack from the plug pack so as to convert into a drive voltage of the electric tool, and to supply the drive voltage to the electric tool when the electric tool adaptor is detachably attached directly to the electric tool and the plug pack.

2. The electric tool system according to claim 1, wherein the drive voltage is a rated voltage of the electric tool, and the DC-DC converter is a step-up/down converter.

3. The electric tool system according to claim 2, wherein the step-up/down converter is configured to convert the voltage of the plug pack to a plurality of levels of the rated voltage.

4. The electric tool system according to claim 3, wherein any one of a plurality of types of battery packs which are different from each other can be attached to any one of a plurality of types of electric tools having different rated voltages.

5. The electric tool system according to claim 2, wherein any one of a plurality of types of battery packs which are different from each other can be attached to the electric tool having a predetermined rated voltage.

6. The electric tool system according to claim 1, wherein the electric tool and the battery pack are a first electric tool configured to use a first battery pack and a second battery pack for a second electric tool, respectively, the first battery pack for the first electric tool is configured to generate a first electromotive force for driving the first electric tool while the second battery pack for the second electric tool is configured to generate a second electromotive force for driving the second electric tool, and the first electromotive force and the second electromotive force correspond to a first drive voltage of the first electric tool and a second drive voltage of the second electric tool, respectively and are different from each other.

7. The electric tool system according to claim 1, wherein the first and second electric tools comprise first and second attachment portions for providing attachment of the first and second battery packs to the first and second electric tools, respectively, the first and second battery packs comprise first and second attached portions configured to be attached to the first and second attachment portions, respectively, and the tool connection portion has a shape corresponding to the first attached portion while the battery connection portion has a shape corresponding to the second attachment portion.

* * * * *